Patented Oct. 25, 1938

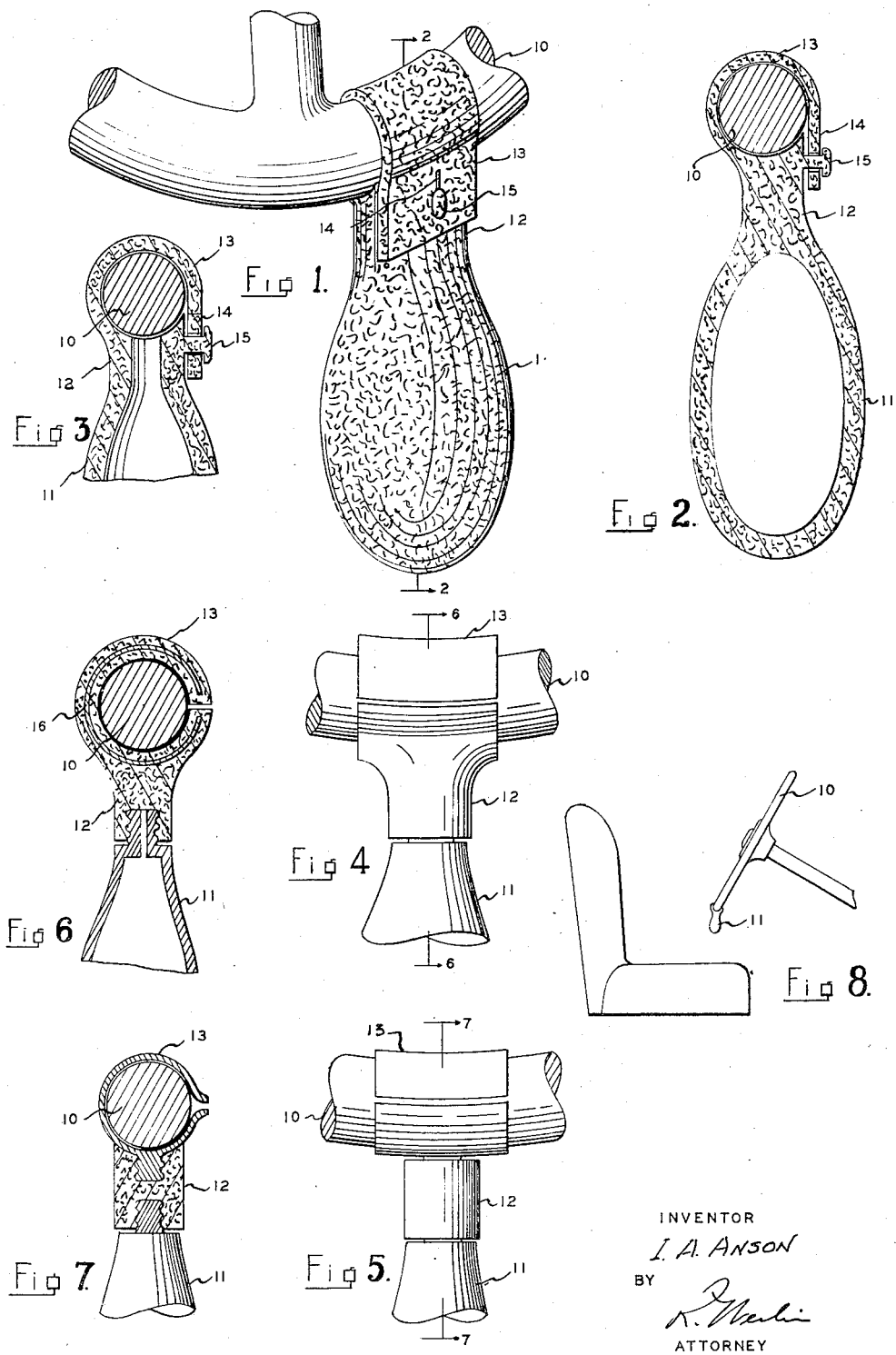

2,134,020

UNITED STATES PATENT OFFICE 2,134,020

STEERING WHEEL ATTACHMENT

Isaac A. Anson, Tulsa, Okla.

Application September 30, 1937, Serial No. 166,465

8 Claims. (Cl. 74—557)

This invention relates to steering wheel attachments and particularly to an attachment for automobile steering wheels which permits holding or manipulating a steering wheel without actually grasping it with the hands.

I have found that in the driving of an automobile and particularly when driving for extended periods of time over long distances, the normal manner of holding and manipulating the steering wheel, wherein both the driver's hands grasp the wheel in positions which require the driver's arms to remain in a raised and more or less unnatural and uncomfortable position, considerable strain develops in the driver's hands, arms, shoulders and back particularly, and results in excessive fatigue, such as will frequently dull the driver's normal reflexes and alertness and thereby increase the danger of accidents.

To obviate these disadvantages, I have devised an attachment for steering wheels, which permits a driver to assume a completely comfortable and relaxed driving position, while at the same time, affords a means permitting the driver to at all times retain positive operating control of the steering wheel.

To this end, I have devised an attachment which comprises generally an auxiliary grip handle which is attachable to a steering wheel and extends from the wheel so as to permit the driver to grasp the handle with one hand while that hand is resting in a completely relaxed position in his lap or in whatever position will afford the greatest degree of relaxation and comfort for the driver. My new attachment is preferably constructed of a rubber or similar composition material which is sufficiently resilient to be comfortably gripped by the hand and sufficiently pliable to yield readily to pressure of contact with more or less solid objects, such as the body or legs of the driver, but which is characterized by sufficient rigidity to afford a positive means of control or manipulation of the wheel by the driver.

Therefore a general object of this invention is to provide an attachment for relieving the strain resulting from the normal method of steering automobiles when driving long distances.

A principal object is to provide an improved flexible but semi-rigid, steering grip which can readily be attached to, or removed from, any steering wheel, or which may be moved from place to place on the wheel as desired by the driver and which will permit the driver to remove his hands from the wheel and allow them to be positioned in a comfortable and relaxed position while enabling adequate steering of the car to be had with one hand, leaving the other hand free for signalling purposes or for purposes of complete rest and relaxation.

In practice, it is found that an auxiliary grip attachment constructed of a rubber composition, which has a hand grip portion in the form of a hollow bulb, shaped to fit the hand, is particularly adapted to comfortable and non-fatiguing gripping by the hand of the driver. The hand grip portion is provided with a shank or neck of the same or similar composition material, which is in turn attached to the wheel by a suitable wheel gripping clamp. The neck portion is constructed of a sufficient thickness of the composition stock to provide sufficient rigidity therein to enable effective control of the wheel by suitable operating movements of the hand grip portion, while at the same time, the neck is sufficiently pliable so that it may be deflected from injurious contact with the body of the driver in the event of sudden stops or collisions which would tend to thrust the body of the driver against the attachment.

Another object is to provide in conjunction with the hand grip and neck portions of the device, a means for attachment to the steering wheel, whereby the device may be readily attached to, or removed from, the wheel, and which may be quickly and easily shifted to various positions on the wheel as dictated by the degree of driving comfort desired.

A practical embodiment of the invention is set forth hereinafter and is shown in the accompanying drawing, in which:

Fig. 1 is a view showing one form of construction of the device of this invention and its position of attachment on a steering wheel.

Fig. 2 is a sectional elevation of the device taken along line 2—2 of Fig. 1.

Figs. 3, 4, 5, 6, and 7 are details of different modifications of the device of this invention, and Fig. 8 is an assembly view showing the normal position of the device with relation to a steering wheel and driver's seat of an automobile.

Referring to the drawing and Figs. 1 and 2 in particular, the steering attachment of this invention is shown attached in the normal driving position to a steering wheel 10. The attachment comprises a hand grip portion 11, which is preferably of bulbular form and constructed of a flexible material such as rubber or a similar pliable composition material. Grip portion 11 normally extends downwardly from the wheel rim and is of suitable length to adapt same to extend to the region of the driver's lap so that it may be grasped by the driver's hand when his hand is resting in a normal comfortable position in his lap. Grip portion 11 is reduced in cross-sectional area at one end to form a neck 12. Neck 12 is constructed of the same composition material as hand grip 11 and it is a feature of this invention to utilize a composition material, which will have sufficient pliability to permit neck 12 to be deflected from its normal pendent position without adversely affecting the measure of control of the steering wheel movements afforded by the positive operating movement of the attachment, while at the same time, neck 12 will retain sufficient rigidity to permit operating movements of hand grip 11 to be positively communicated to the steering wheel rim for effective control of its movements.

At one side of neck 12 is attached a tie strap 13 constructed of the same or similar material as that forming the hand grip and neck portions. Tie strap 13 is sufficiently long to encircle the rim of the wheel 10 and is provided with one or more slits 14 for attachment of the free end of strap 13 to a button or fastener 15 mounted on neck 12. Strap 13 is of sufficient width so that when the steering attachment is in place on the wheel, leverage of the strap on the wheel rim will be provided sufficient to enable lateral movements of the steering grip 11 and neck 12 to control the steering movements of the wheel. Strap 13 will be made sufficiently thick to provide a degree of rigidity to make the leverage action comparatively positive.

All of the parts of the described device, including grip 11, neck 12, strap 13 and button 14, will normally be constructed of the same composition material in order that the entire device can be molded or otherwise formed in a single manufacturing operation, since the device may thus be manufactured very cheaply.

The particular rubber composition adaptable to the construction of the device is similar to that commonly used in the construction of automobile inner-tubes, as that composition is found to have that degree of pliability and semi-rigidity required by the device.

By constructing tie strap 13 of rubber composition, advantage may be taken of the natural frictional characteristics of this material in providing a positive yet slidable connection of the attachment of this invention to the steering wheel. By virtue of this characteristic of rubber compositions, it is unnecessary to pull strap 13 tightly about the wheel rim, but rather the connection may be left somewhat loose and by maintaining a very slight tension on grip portion 11, such as that which would normally be exerted by the weight of the driver's hand, the strap will be held in sufficiently close contact with the wheel rim to afford the desired degree of control of the wheel operation. At the same time, if it becomes desirable to move the attachment to a different position on the wheel rim, a slight movement of the grip portion toward the wheel rim will loosen the contact of strap 13 therewith, and the attachment can then be easily shifted to some other position on the wheel. Similarly, the attachment may be rotated about the wheel rim from its normal pendent position to a position within the periphery of the wheel when it becomes desirable to dispense with its use in operating the wheel.

Fig. 3 illustrates a slight modification in the form of construction of neck 12, in that the neck portion in this modification is hollow, but of tubular form and will thereby retain the desirable characteristics of pliability and semi-rigidity. This form of construction will be useful when a somewhat greater degree of rigidity is desired than is provided by the solid form of neck shown in Figs. 1 and 2, while at the same time reducing the amount of material in the neck portion and so further reduce the cost of manufacture of the device.

Figs. 4 and 6 illustrate another modification in which tie strap 13 is in the form of a spring clamp adapted to yieldably grip the wheel rim. The clamp in this modification may be made entirely of rubber composition, the natural tendency of which is to resist distension and so to normally grip the wheel rim at all times. This type of wheel connection may be reinforced by a spring steel member 16 imbedded in the rubber composition. This form of attachment is connected to the wheel rim by spreading the jaws of the clamp until the wheel rim is received in the preformed opening in the clamp, whereupon the jaws are released and the attachment becomes firmly connected to the wheel.

In the modification illustrated in Figs. 4 and 6, neck 12 is constructed of a rubber composition having the same desired characteristics of pliability and semi-rigidity described in connection with the form illustrated in Figs. 1 and 2 and described above. The hand grip portion 11, however, may be made of solid material such as metal and is detachably connected to neck 12. While this modification does not possess the degree of hand gripping comfort inherent in the principal modification, nevertheless, by virtue of the pliability and semi-rigidity of the neck portion, this type of attachment will also provide the advantages of ready deflection from the normal position while affording positive control of the wheel movements.

Figs. 5 and 7 illustrate still another modification wherein only neck 12 is constructed of rubber composition of the desired characteristics, while both the wheel connection clamp and the hand grip portion are constructed of metal or other rigid material. This form of construction, however, also affords the advantageous movements of the previously described modifications.

From the foregoing it will be evident that by means of any one of the described modifications of my new steering wheel attachment, the ordinary steering wheel movements may be completely controlled with one hand by the driver while that hand is in a comfortably supported position in the driver's lap, the other hand being free for purposes of signalling or repose. It will also be evident that the pliability of the attachment greatly reduces the danger of injury to the driver from sudden stops or collisions which might tend to impel the body of the driver toward the wheel or attachment. My new invention, therefore, provides a safe, simple means for greatly reducing the fatigue normally resulting from extended periods of driving.

It will be seen, therefore, that my new invention comprises broadly a steering wheel attachment consisting of a hand grip and a connection for operatively connecting said hand grip to a steering wheel, said connection being sufficiently pliable to permit deflection of the hand grip from its normal position without adversely affecting the control of the steering wheel and being sufficiently rigid to permit the hand grip to retain operative control of the steering wheel.

It will be understood that my new steering wheel attachment may also be utilized advantageously in connection with steering wheels other than automobile steering wheels. For example, my new attachment may be used in steering of boats or in operating certain types of industrial machinery where a wheel is used more or less continuously in controlling certain of the machine operations.

Furthermore, while I have mentioned rubber compositions as preferable for the construction of the essential portions of the attachment, I may use other composition materials or I may even use metallic materials in the form of fine wire which is woven or twisted to provide an attachment possessing the heretofore described essential characteristics of pliability and semi-rigidity for the purposes described.

What I claim and desire to secure by Letters Patent is:

1. A steering wheel attachment of the class described comprising a hand grip adapted to be attached to a steering wheel in depending position, a wheel connection means for operative attachment of said hand grip to said wheel and a pliable member operatively uniting said hand grip to said wheel connection means, said pliable member being sufficiently rigid to transmit positive operating movements to said wheel by leverage action thereon of said hand grip.

2. A steering wheel attachment of the class described comprising a hand grip adapted to be attached to a steering wheel in depending position, a wheel connection means yieldably mounted on said wheel and a pliable member operatively uniting said hand grip to said wheel connection means, said pliable member being sufficiently rigid to transmit positive operating movements to said wheel by leverage action thereon of said hand grip.

3. A steering wheel attachment of the class described comprising a hand grip adapted to be attached to a steering wheel in depending position, a wheel connection means yieldably mounted on said wheel and movable thereon, and a pliable member operatively uniting said hand grip to said wheel connection means, said pliable member being sufficiently rigid to transmit positive operating movements to said wheel by leverage action thereon of said hand grip.

4. A steering wheel attachment of the class described comprising a hand grip adapted to be attached to a steering wheel in depending position, a wheel connection means mounted on said wheel and a member operatively uniting said hand grip to said wheel connection means, said hand grip, wheel connection means and said uniting member being constructed of a pliable composition material characterized by sufficient degree of rigidity whereby said uniting member will transmit positive operating movements to said wheel by leverage action thereon of said hand grip.

5. A steering wheel attachment of the class described comprising a hand grip adapted to be attached to a steering wheel in depending position, a wheel connection means yieldably mounted on said wheel and in frictional contact therewith, and a pliable member operatively uniting said hand grip to said wheel connection means, said pliable member being characterized by a sufficient degree of rigidity to transmit positive operating movements to said wheel by leverage action thereon of said hand grip.

6. A steering wheel attachment of the class described comprising a hand grip portion adapted to be attached to a steering wheel and extend therefrom, a wheel connection means for operative attachment of said hand grip to said wheel and a pliable member operatively uniting said hand grip to said wheel connection means, said pliable member being sufficiently rigid to transmit positive operating movements to said wheel by leverage action thereon of said hand grip.

7. A steering wheel attachment of the class described comprising a hand grip adapted to be attached to a steering wheel, a wheel connection means for operative attachment of said hand grip to said wheel and a non-metallic composition member operatively uniting said hand grip to said wheel connection means, said member being sufficiently pliable to permit deflection of said hand grip from its normal position with respect to the wheel and sufficiently rigid to transmit positive operating movements to said wheel by leverage action thereon of said hand grip.

8. As a new article of manufacture, an auxiliary attachment for steering wheels comprising an extension handle adapted to be adjustably mounted on a steering wheel, said handle being constructed of a pliable composition material which will permit deflection of the handle from its normal position with respect to the steering wheel but having sufficient rigidity to transmit positive operating movements to said steering wheel by leverage action thereon of said handle.

ISAAC A. ANSON.